April 5, 1949.  R. E. McLEAN  2,466,117
ROTARY FEED WHEEL TYPE CAN OPENER
Filed Jan. 22, 1945  5 Sheets-Sheet 3

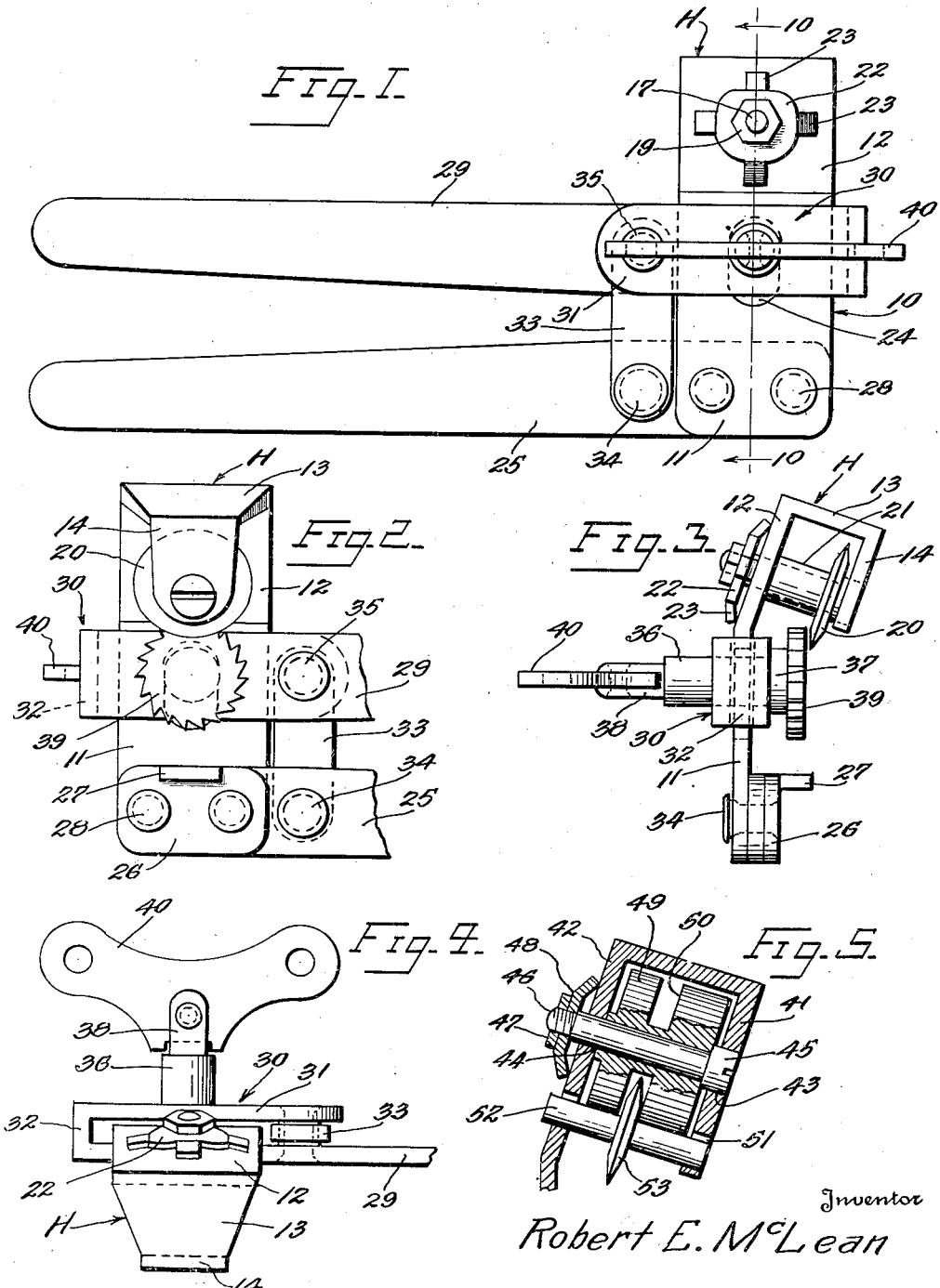

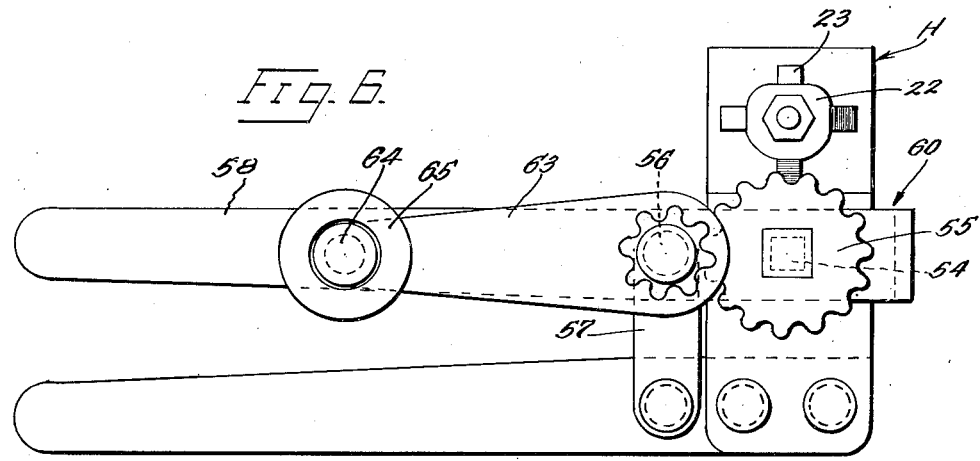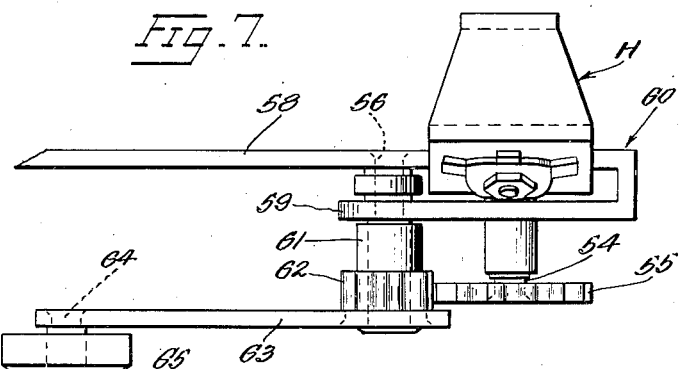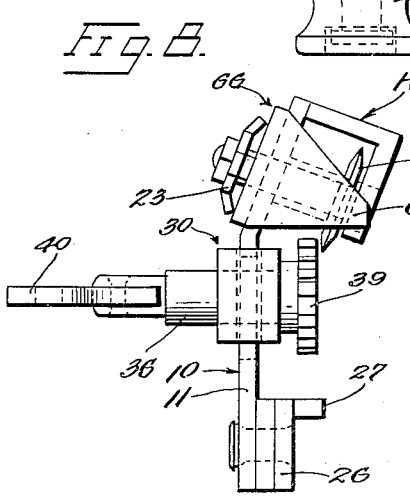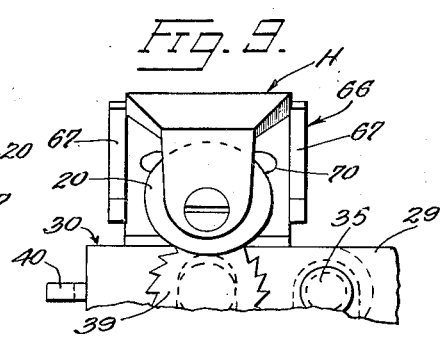

Inventor
Robert E. McLean
By Wilfred E. Lawson
Attorney

April 5, 1949.   R. E. McLEAN   2,466,117
ROTARY FEED WHEEL TYPE CAN OPENER
Filed Jan. 22, 1945   5 Sheets-Sheet 4
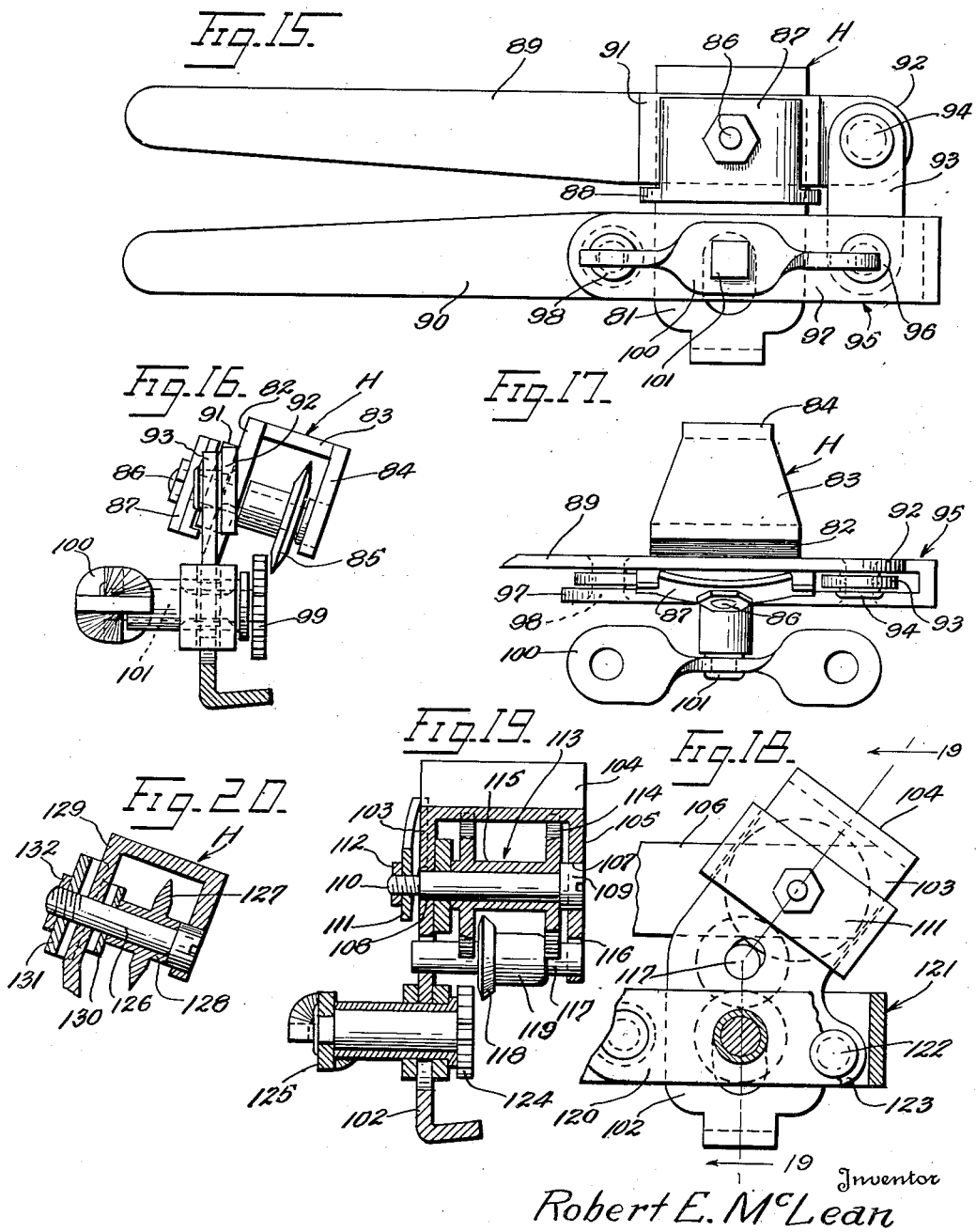
Inventor
Robert E. McLean
By Wilfred E. Lawson
Attorney April 5, 1949.　　　　　R. E. McLEAN　　　　　2,466,117
ROTARY FEED WHEEL TYPE CAN OPENER
Filed Jan. 22, 1945　　　　　　　　　　　　5 Sheets-Sheet 5
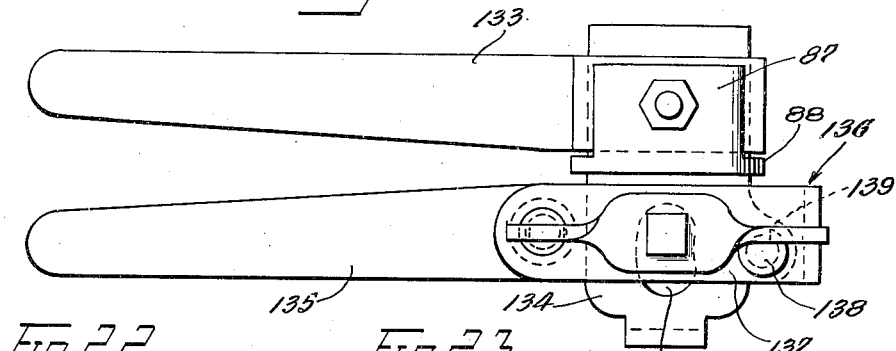
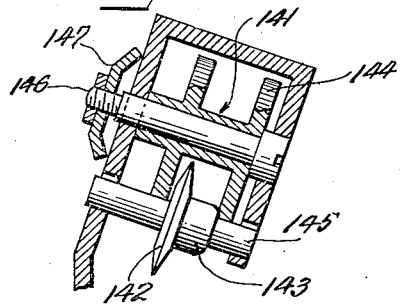
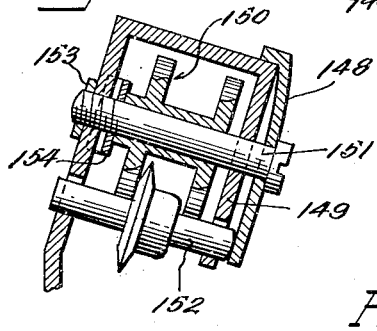
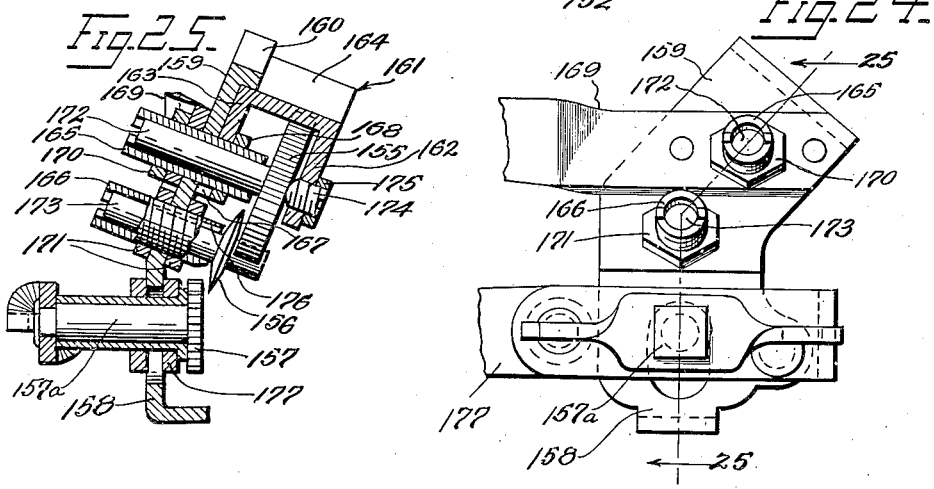
Robert E. McLean, Inventor
By Wilfred E. Lawson, Attorney

UNITED STATES PATENT OFFICE 2,466,117

ROTARY FEED WHEEL TYPE CAN OPENER

Robert E. McLean, Fort Benning, Ga.

Application January 22, 1945, Serial No. 573,822

24 Claims. (Cl. 30—9)

This invention relates generally to the class of kitchen and table articles and pertains particularly to can opening implements of the rotary feed wheel type.

An object of the present invention is to provide a rotary feed wheel type can opener which is so designed that the degree of pressure between the can rim engaging feed or driving wheel and such rim is easily varied, as may be found necessary, by the hand of the operator holding the implement in position upon the can, while the other hand is employed for effecting the rotation of the feed wheel, relative to the head of the can which is penetrated by the cutter.

Another object of the invention is to provide in a rotary feed wheel type can opener employing a rotatable can rim or bead engaging driving wheel, and a cutter, a means carrying the feed or driving wheel whereby such wheel is readily movable relative to the cutter and may be easily so moved to shift the head of a can, to which the implement has been applied, in a direction to force the cutter through the head.

Another object of the invention is to provide a can opener having a pair of relatively long parallel handles, one of which is fixed to a body forming a part of the implement while the other one is oscillatable and is operatively connected with a can rim bead engaging feed or driving wheel to effect the shifting of such wheel relative to a cutter carried by the body when the handles are compressed or squeezed together.

A still further object of the invention is to provide in a can opener of the type stated, a cutter carrying body member with which is rigidly connected one of a pair of relatively long handle members, the other handle member being connected with a yoke enclosing a portion of the body member and such yoke carrying a rotatable can rim bead engaging driving wheel which, upon oscillatory movement of the second mentioned handle relative to the first, effects the shifting of the driving wheel relative to the body carried cutter.

A still further object of the invention is to provide a can opener employing a rotatable or disk type cutting wheel with means for yieldingly holding such cutter wheel in a prescribed position relative to a rotatable can rim bead engaging driving wheel.

Still another object of the invention is to provide a rotary feed wheel type can opener employing a rotatably mounted cutting wheel, with a novel roller bearing means for the rotatable cutter, by means of which the rotating and cutting action of the cutter is materially improved.

Still another object of the invention is to provide in a can opener of the character stated, a rotatably mounted cutting disk having bearing wheels contacting the supporting shaft of the disk and yieldingly maintaining the disk in a prescribed position relative to a can rim bead engaging driving wheel.

Other objects and advantages of the invention will become apparent as the description of the same proceeds and the invention will be best understood from a consideration of the following detailed description taken in connection with the accompanying drawings forming a part of the specification, with the understanding, however, that minor changes and modifications may be made in the several embodiments of the invention without departing from the spirit of the invention, so long as such changes or modifications are within the scope of the appended claims.

In the drawings:

Figure 1 is a view in elevation of the outer side of a rotary feed wheel type can opener constructed in accordance with one embodiment of the present invention.

Figure 2 is a view in elevation of the inner side of the opener shown in Figure 1, the outer ends of the handles being broken off.

Figure 3 is a view in front elevation of the opener shown in Figure 1.

Figure 4 is a view in top plan of the same.

Figure 5 is a vertical section through a modified head construction showing bearing wheels engaging the shaft of a rotatably mounted disk cutter.

Figure 6 illustrates in elevation the outer side of the opener showing a modification of the can rim bead engaging driving wheel actuating means.

Figure 7 is a view in top plan of the structure shown in Figure 6, with portions of the handles broken away.

Figure 8 is a view corresponding to Figure 3 but showing the application to the structure of the can rest which is illustrated in perspective in Figure 12.

Figure 9 is a view of the inner side of the implement equipped with the can rest shown in Figure 8.

Figure 15 is a view in elevation of the outer side of a can opener constructed in accordance with another embodiment of the invention.

Figure 16 is a view in front elevation of the embodiment shown in Figure 15, the lower portion of the body plate being in vertical section.

Figure 17 is a view in top plan of the structure shown in Figure 15.

Figure 18 illustrates, partly in side elevation and partly in section, the outer side of another embodiment of the invention.

Figure 19 is a sectional view taken substantially on the line 19—19 of Figure 18.

Figure 20 is a sectional view through the head portion of a body plate showing a yieldable means for maintaining the cutter wheel in a prescribed position.

Figure 21 is a view in elevation of the outer side of the can opener constructed in accordance with another embodiment of the invention.

Figure 22 is a detail sectional view showing another embodiment of the roller bearing wheel.

Figure 23 is a detail sectional view showing another form of means for yieldingly holding the cutter disk and bearing wheel in a prescribed working position.

Figure 24 is a view in elevation of the outer side of a modification of a construction corresponding to the embodiment illustrated in Figures 18 and 19.

Figure 25 is a sectional view taken on the line 25—25 of Figure 24.

Figure 10:
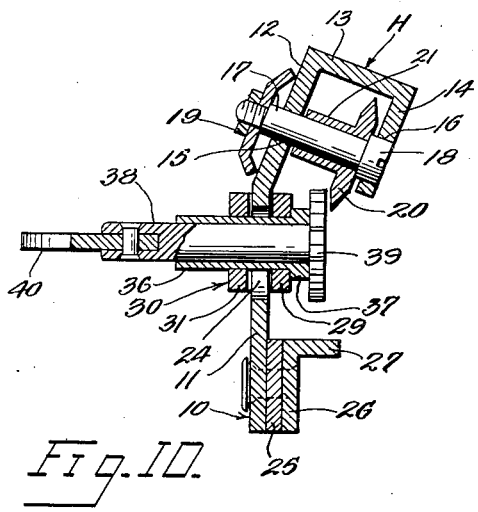
Figure 10 is a sectional view taken substantially on the line 10—10 of Figure 1.

Referring now more particularly to the drawings, the numeral 10 generally designates, in the embodiment of the invention illustrated particularly in Figures 1 to 4 inclusive, the body of the implement. This body comprises a flat metal plate of suitable width, thickness and height or length, designated 11 and having a portion of its upper end obliquely angled or inclined as indicated at 12 toward that side of the implement which is nearest to the top of the can when the implement is in applied position, such side being considered and hereinafter referred to as the inner side. Extending inwardly at right angles from the top edge of the portion 12 of the body plate is the extension 13 which terminates in the downwardly extending portion 14 which is parallel with the portion 12, as shown in Figure 3.

The portions 12, 13 and 14 which are integral parts of the body plate, combine to form a head which is generally designated H, within which the hereinafter described cutting element is carried.

The parallel portions 12 and 14 of the head are provided with the coaxial bearing openings 15 and 16 respectively through which extends the arbor pin 17. The head of this arbor is designated 18 and fits in the opening 16 which is in the inner or free portion 14 of the head while the arbor pin at its other end extends through the portion 12 and is provided with screw threads to receive a securing nut 19.

Rotatably mounted upon the arbor pin 17 is the peripherially sharpened cutter wheel 20 with which is integrally formed, upon one side, the hub 21 which lies between the cutter wheel and the portion 12 of the head. The opposite side of the cutter 20 from the hub portion 21, bears against the underside of the arbor pin head 18 and, as is clearly shown, there is a slight clearance between the cutter wheel 20 and the adjacent portion 14 of the head which permits slight movement of the cutter and arbor axially, the head 18 sliding in the bearing opening 16.

This axial movement of the cutter and its hub is opposed by the washer 22 which is interposed between the portion 12 and the nut 19 and is maintained in spaced relation with the portion 12 by the radially extending resilient fingers 23 which bear against the outer side of the head portion 12 as shown in Figures 1, 3, 4 and 10.

Below the angle between the portion 12 of the head and the lower part of the plate 11 there is formed upon the longitudinal center of the plate and, consequently, in the vertical central plane of the head in which the arbor pin 17 lies, the elongated guide opening 24.

Below the guide opening 24 there is secured to the plate 11 an end of a relatively long rigid handle 25 which extends beyond one longitudinal edge of the body plate in substantially perpendicular relation thereto. Upon the innerside of the attached end of the handle 25 is located a can rest plate 26 from the upper edge of which there projects inwardly the can rest flange 27. The plate 26 and the handle 25 are preferably secured by rivets 28 although any other suitable fastening means may be employed.

Disposed above and in parallel relation with the rigid fixed handle 25 is a shiftable handle 29, the inner end portion of which is turned back to form a yoke which is generally designated 30, one side of which yoke, which is substantially U-shaped, and which comprises the inner end of the handle 29, passing across the inner face of the body plate while the opposite side or leg, designated 31, passes across the outer side of the plate. The web portion connecting the inner end of the handle with the leg 31 of the yoke is designated 32 and this passes across the opposite longitudinal edge of the body plate from that edge across which the handles extend.

The handles 25 and 29 are both disposed upon the inner side of the body plate and therefore are disposed one directly above the other as clearly shown in Figures 3 and 10 and adjacent to the edge of the body plate opposite from the web 32, is located a coupling link 33, the lower end of which is pivotally attached to the fixed handle by the pin 34 while the upper end is located between the handle 29 and the free end of the yoke leg 31 and is pivotally joined to these elements by the pivot pin 35.

Extending through the two sides of the yoke 30 and through the guide opening 24 is a bearing sleeve 36 which has an integral collar 37 upon its inner end which bears against the inner side of the handle portion of the yoke.

Extending through the bearing sleeve 36 is a shaft 38 which carries upon its inner end the toothed can rim bead engaging driving wheel 39, the inner face of which is in a plane passing upon the outer side of the cutting wheel and spaced therefrom as shown in Figure 3.

The outer end of the driving wheel shaft 38 carries a thumb and finger crank 40 by means of which the wheel 39 is rotated.

It will be seen from the foregoing that when the handles 25—29 are squeezed together in the hand, the oscillatable handle 29 will swing on the upper end of the link 33 so as to raise the cam rim engaging driving wheel 39 into the operative position with respect to the cutter 20, in which it is shown in Figures 1, 2, 3 and 10. When the yoke is allowed to swing downwardly toward the fixed handle 25, the toothed edge of the wheel 39 will separate sufficiently from the lowermost part of the cutting edge of the cutter 20 to permit the insertion between the two wheels of the bead of a can so that such bead may be brought to rest upon the top of the wheel 39 while the side of the can rests against the can rest flange 27. By then squeezing the handles together as previously stated the driving wheel 39 will press upwardly against the under edge of the can rim bead and cause the cutting edge of the cutter wheel 20 to penetrate the top of the can. While thus holding the handles together with one hand, the wheel 39 may be rotated by manipulating the crank 40 with the thumb and finger of the other hand thus turning the can in the customary well-known manner to effect the cutting out of the head thereof.

It will be readily apparent that the degree of friction engagement between the toothed edge of the can driving wheel 39 and the bead of the can, may be controlled by the amount of pressure applied to the oscillatable handle 29, the guide opening 24 being extended sufficiently to permit the upward movement of the driving wheel beyond the position necessary for the smooth and satisfactory operation of the parts.

When the driving wheel 39 and cutter 20 are in cooperative relation as shown particularly in Figures 2, 3 and 10, the wall of the can and a portion of the top will be interposed between the inner side of the wheel 39 and the opposing face of the cutter. If an unusually thick portion of the can wall should be encountered or when the seam of the can wall moves around to pass between the wheels 20 and 39, the cutting wheel will be shifted inwardly slightly toward the side 14 of the head, against the tension of the spring washer fingers 23, the head 18 of the arbor pin slipping laterally the necessary extent in the bearing opening 16. As soon as the thickened portion or seam of the can wall has been passed the spring washer will draw the cutting wheel 20 back to its previous position.

Figure 5 illustrates a slightly different mounting for the cutter wheel together with a roller bearing forming means for the cutter wheel shaft. In this construction the inner and outer sides of the head are designated 41 and 42 respectively and are provided with inner and outer bearing openings 43 and 44 which receive respectively the head 45 and the outer end portion of a roller arbor 46. The outer end of this arbor carries the nut 47 which bears against the spring washer 48 of the same construction as the washer 22.

Rotatably supported upon the arbor 46 is a roller bearing wheel 49 which is provided with the relatively deep peripherial channel or slot 50.

The portions 41 and 42 of the head have formed therethrough, below the openings 43 and 44, the elliptical bearing openings 51, the long axes of which extend longitudinally of the portions 41—42 of the head.

In the elliptical bearing openings 51 are rotatably supported the ends of the cutter wheel shaft 52 and upon this shaft is fixed the cutter wheel 53. The wheel 53 extends into the slot 50 of the bearing roller 49 and the portions of the roller periphery at the two sides of the channel 50 frictionally engage the cutter wheel shaft 52 as shown.

As will be readily apparent from the foregoing when a thrust is applied to the cutting edge of the wheel 53 by the can top or head, the contact pressure between the shaft 52 and the periphery of the roller 49 will be increased and as the cutter wheel 53 is rotated the shaft thereof will turn against the periphery of the roller, causing the roller to turn as a bearing for the shaft.

The inner side of the cutter wheel 53 bears against the adjacent face of the channel 50 and the inner side of the roller bears against the head 45 which projects beyond that side of the portion 41 which is in opposed relation with the roller. Thus there is a clearance between the roller and the portion 41 of the head, permitting the inward movement of the roller and cutter wheel against the tension of the spring washer 48 to allow for variations in the thickness of the can wall as described in connection with the structures of the preceding figures.

Figures 6 and 7 illustrate a modification of the thumb and finger crank mechanism for turning the can rim bead engaging driving wheel. In this embodiment of the invention the shaft 54 with which the toothed driving wheel is connected, has mounted upon the outer end, in place of the thumb and finger crank 40, a toothed wheel or gear 55.

The pivot 56 by which the upper end of the link member 57 is connected between the oscillatable handle 58 and the leg 59 of the yoke 60, is extended outwardly through the hub 61 which forms a part of the gear wheel pinion 62, which is in mesh with the gear 55. The outer end of the shaft terminates in a suitable aperture in the crank arm 63. The crank arm 63 may rotate freely around the pin 56 and the gear pinion 62 is secured to the arm preferably by extending the teeth through the arm as shown in Figure 6 whereby such teeth function as locking keys to prevent the arm turning independently of the pinion.

The outer end of the arm has mounted thereon, by means of the pivot pin 64, the handle or knob 65.

Figures 8 and 9 illustrate the application to the embodiment of the device illustrated in Figures 1 to 4 and 10, of a can rest which may be applied to the head H and which is generally designated 66. This can rest is shown in perspective, unmounted, in Figure 12.

It will be readily apparent that the use of the can rest 66 upon any of the different embodiments of the invention, in the manner illustrated, is optional. When used this can rest serves as a stabilizer for the can, the rim or bead of the can being compressed between the can driving wheel and the bottom edges of the can rest arms 67. These arms are, as shown, formed integral with a back plate portion 68 which is provided with a suitable central opening 69 for the extension therethrough of the arbor pin, and the outlying or flanking openings 70 through which may be passed suitable securing screws which would be threaded into openings formed in the angularly extending portion 12 of the head.

This can rest 66, when used, holds the can rigidly in the device and permits the operator to regulate the pressure of the can driving wheel 39 or the corresponding driving wheels of many of the hereinafter described embodiments of the invention, against the underside of the can rim for proper traction therewith.

Figure 11:
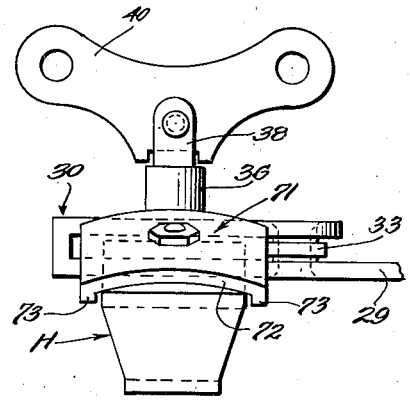
Figure 11 is a view corresponding to Figure 4 but showing the application to the top of the body of a spring plate of the form illustrated in perspective in Figure 13.
Figure 13:
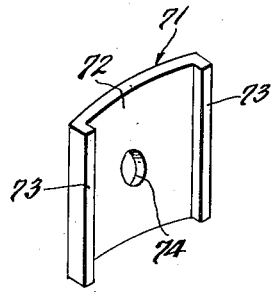
Figure 13 is a view in perspective of the spring plate shown applied in Figure 11.

Figure 11 illustrates the application to the head of the implement, of an alternate type of spring which may be substitued for the spring washer 22, this alternate type of spring being generally designated 71 and being illustrated in perspective in Figure 13. This spring body 71 comprises a transversely arcuate plate 72 having the low or shallow turned flanges 73 paralleling its longitudinal edges, and a central aperture 74 for the reception of the threaded end of the arbor pin 17. When used, the flanges 73 of this spring will be located adjacent to the edges of the upper part of the head of the implement as is clearly shown in Figure 11 or to the outer sides of the can rest 66 if this spring should be used in association with the can rest in substitution for the spring 22.

Figure 14:
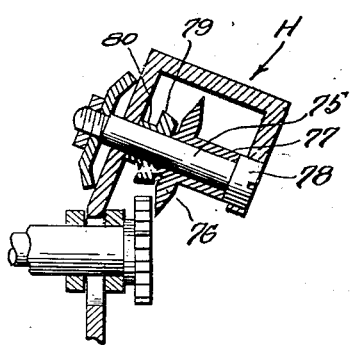
Figure 14 is a detail section through a modified cutter supporting head showing a can bead engaging roller mounted coaxial with the cutter.

Figure 14 is a sectional view of another alternate head construction for use with any embodiment of the implement. This head construction is the same as that illustrated in Figures 3 and 10 with the exception that the cutter wheel and hub are reversed and are used in association with a cooperating roller.

In the structure shown in Figure 14 the top part of the head H, corresponding to the part 13 of the structure shown in the previously described embodiment of Figure 10, is of slightly greater length and the arbor 75 is correspondingly lengthened.

The cutter wheel 76 has the free end of the hub 77 thereof bearing against the inner side of the arbor head 78 so that the wheel is positioned inwardly from the arbor head. Encircling the arbor 75 between the wheel 76 and the angled top portion of the body plate, is a cooperating roller 79 which has a short hub portion 80 which maintains the roller spaced from the adjacent portion of the head as shown.

The edge of the roller 79 is knurled to assure proper traction upon the rim of the can by which it is engaged. In this construction the rim of the can is pressed between the can driving wheel and the roller 79 and it will be readily apparent that by increasing the compression of the handles of the implement the compression of the rim of the can between the driving wheel and the roller 79 will be greatly increased.

Figure 12:
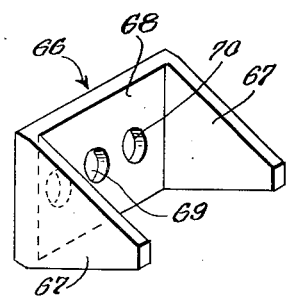
Figure 12 is a view in perspective of the can rest shown applied in Figures 8 and 9.

It will also be readily apparent that the can rest 66, shown in Figure 12 can be used with this head construction of Figure 14, if desired. If used, the arms 67 of the can rest would be of such height above the rim of the can that both arms could not bear against the top of the rim of the can simultaneously, but would be sufficiently close to the top of the rim of the can as to prevent the can from undue tilting while in the device.

Figures 15, 16 and 17 illustrate, respectively, the outer side, the front and the top of another or third embodiment of the implement. A portion of Figure 16 is in vertical section to more clearly illustrate the construction.

The principal difference between this embodiment and the one first described is that the upper handle is fixed or securely fastened to the body and is extended forwardly of the body to be connected with the forwardly extended portion of the yoke forming a part of the lower handle which is movable.

In the embodiment of Figures 15 to 17 inclusive, the body plate is designated 81 and the upper portion of such plate is angled as indicated at 82 to form a side of the head H, such head having the inwardly and downwardly extending top portion 83 and the depending inner portion 84.

The cutter wheel is designated generally by the reference character 85 and is here shown as having the arbor 86 on which it turns, extended through an arcuate spring plate 87 which has the laterally projecting inturned positioning fingers 88 at the bottom edge thereof.

The fixed and movable handles for this embodiment are designated respectively 89 and 90 and, as shown most clearly in Figure 15, the fixed handle is located above the movable handle and at the outer side of the inclined portion 82 and has an angularly offset portion 91 which corresponds to the angle of the portion 82 against which it bears, while allowing the rear portion of the handle to remain in a vertical plane above and parallel with the lower handle 90.

The forward end of the fixed handle 89 is extended to provide the link ear 92 which lies above and is parallel with the extended underlying portion of the handle 90 with which it is pivotally connected by the link 93, the upper end of the link being attached to the extension 92 of the fixed handle by a rivet 94 while the lower end of the link is pivotally coupled between the sides of the yoke 95 by means of the pivot pin 96, one of the sides of the yoke comprising a portion of the movable handle as will be readily understood.

As will also be readily apparent the body plate 81 lies between the inner side of the yoke 95 and the outer side or leg 97 thereof and the free end of such leg 97 is coupled with the handle 90 by the transverse pin 98.

As in the previously described embodiments the driving wheel 99, and the other parts connected therewith, are supported entirely by the yoke and it will be readily apparent upon reference to Figure 15 that in the present embodiment movement of the can driving wheel 99 relative to the cutter wheel 85 is effected by oscillating the handle 90 upon the link pivot pin 96.

The thumb and finger crank here illustrated for effecting the turning of the can driving wheel 99 is generally designated 100 and is formed from a single piece of material of suitable width and thickness, with each end twisted 90° in relation to the central portion which is coupled with the driving wheel shaft 101 by swaging the end of the shaft passing therethrough or in any other suitable manner. This particular form of handle may be used with the first embodiment or the handle 40 of such embodiment may be used in place of this handle 100, as may be found convenient or desirable.

Figures 18 and 19 illustrate a variation of the head construction illustrated in Figure 5 and there is shown in this construction a differently shaped cutter wheel, the axis of which is substantially perpendicular to the upright body portion of the implement. A cutter wheel of the shape shown here may be used in substantially the same form with the other embodiments or constructions of the invention.

In the construction of Figures 18 and 19, the body plate is generally designated 102 and as is shown most clearly in Figure 18 the upper portion of the plate which forms one side of the head, is inclined forwardly. Such upper portion and the associated top and inner side portions are designated 103, 104 and 105 respectively.

The fixed upper handle in this construction is designated 106 and the forward end of this handle is disposed against the inner side of the body plate portion 103 and is secured thereto in any suitable manner.

Formed through the portions 103 and 105 of the head and also through the fixed handle 106, are inner and outer openings 107 and 108 for the reception respectively of the head 109 of the arbor pin 110 and the outer end of such pin as shown in Figure 19.

Extending across the outer side of the portion 103 is a bowed spring 111 corresponding to the springs 71 and 87 and the threaded outer end portion of the arbor pin extends through this spring as shown and receives the securing nut 112.

Within the head between the portions 103 and 105 the arbor pin has mounted thereon the roller unit which corresponds generally in construction to the roller 49 and which is generally designated 113. This unit comprises the relatively widely spaced circular or wheel-like portions 114, which are connected by the hub 115. The inner end of the hub or inner side of one wheel-like member 114 bears against the arbor pin head 109 as shown and is adapted to have slight movement relative to the adjacent head portion 105, while the opposite end of the hub 115 bears against the inner side of the handle 106.

The body plate and the inner portion 105 of the head have elliptical openings 116 in which are mounted the ends of the shaft 117. Upon the shaft is carried the cutter wheel 118, the peripheral edge of which is of somewhat sligtly different form from the previously described wheels and upon the inner side of this cutter wheel is a hub 119 which bears against the portions 114 of the roller. This hub and the cutter are disposed between the spaced wheel-like parts of the roller and it will be readily apparent that when inward thrust is applied to the cutter 118 by a thickened portion of a can rim the cutter wheel and the roller unit will move slightly to the right or toward the inner side of the implement. Return movement of such unit is effected by the bow spring 111 in a manner which will be readily apparent.

The lower part of the body plate 102 is constructed in a manner similar to the embodiment illustrated in Figure 15 to the extent that the lower handle 120 is oscillatable and extends beyond the forward edge of the body plate where it is pivoted for oscillation. This forward end portion of the handle is bent back upon itself to form the yoke 121 which encloses the lower part of the plate, and there is extended through the forward part of the yoke the pivot pin 122, which passes through an aperture in the forwardly extending ear portion 123 forming an integral extension of the body plate.

The driving crank for the can engaging driving wheel 124 is designated 125 and is constructed in the same manner as the crank 100 hereinbefore described.

Figure 20 is a view illustrating a head construction using the type of cutter wheel and cutter wheel journal screw or arbor pin similar to Figure 10 in which the cooperating grooved roller, such as that shown in Figure 5 or the one shown in Figure 19, is not employed, but having spring controlled axial movement of the arbor pin.

In this construction of Figure 20 the arbor pin for the head H, is designated 126 while the cutter wheel is designated 127 and has extending from each side, the hub 128.

Disposed across the inner side of the outer portion 129 of the head is a bowed spring 130, corresponding to the spring 111 and having the pin 126 extended therethrough as shown. Against the inner side of this spring 130, the outer end portion of the hub 128 bears and the spring maintains the opposite end of the hub in firm contact with the head of the arbor pin.

Extending across the outer side of the portion 129 is a slightly wider and heavier bowed spring 131, of the same form as the spring 130 and through which the outer end of the pin 126 passes, the nut 132 which is threaded upon the arbor pin, bearing against this spring. This spring 131 exerts a somewhat stronger influence upon the arbor pin and the cutter wheel than the inner spring 130, to constantly maintain the cutter wheel in proper working position relative to the toothed can driving wheel with which the cutter may be employed.

Figure 21 illustrates a further embodiment of the invention, the view of which is of the outer side thereof. This further or fifth embodiment distinguishes from the embodiment shown in Figures 15 to 17 inclusive, and is similar to the fourth embodiment shown in Figures 18 and 19, in that the fixed handle 133 is terminated at or adjacent to the front edge of the body 134 while the lower or movable handle 135 has extended through the forward end thereof, which forms a part of the yoke 136, and the outer side or leg 137 of such yoke, the pivot pin 138 which passes through a forwardly projecting ear 139 which forms an integral extension of the front edge of the body plate, as illustrated.

In the body 134, the slot 140, corresponding to the slot 24 of the previous embodiment, is longitudinally arcuate and formed on the radius of the axis of the pin 138.

It will be readily apparent that the operation of this fifth embodiment of the invention is the same as that of the previously described embodiments and also that the can rest 66, may be used with this embodiment if desired, between the end of the fixed handle and the body plate.

Figures 22 and 23 illustrate other variations of the head construction as shown in Figures 5 and 19. In the construction of Figure 22 the channel or groove in the roller, here designated generally as 141, is wider than the channel shown in the roller illustrated in Figure 5 but corresponds to the roller 113 of Figure 19 and, like the structure shown in Figure 19, the cutter wheel 142 has a hub 143 upon its inner side, which takes the lateral thrust against the inner circular or wheel-like portion 144 of the roller unit. Due to the angle between the lower circumference of the cutter wheel 142 and the point of contact between the hub 143 and the inner circular portion 144 at the circumferential edge thereof, greater lateral thrust can be withstood without unseating the shaft 145 of the cutter wheel from radial contact with the circumference of the outer circular portion of the cooperating grooved roller 141 and the upthrust during the cutting operation will always be sufficient to assure seating of the said shaft 145 against the circumference of the outer circular portion of the cooperating grooved roller unit.

The arbor pin 146 upon which the unit 141 turns is threaded through the spring washer 147, corresponding to the previously described washer 22, in order that the arbor pin may be adjusted to compensate for wear, if ever required, as well as for adjustment of the spring tension for lateral resiliency, if desired.

Figure 23 illustrates still another variation of the head construction of Figure 5, and corresponding to the constructions shown in Figures 19 and 22. In this construction there is provided the arched spring 148 which has one end seated against the upper end of the outer portion 149 of the head, as illustrated. The grooved or circumferentially channeled roller, generally designated 150, is mounted upon the arbor pin 151 which, at its headed end, passes through the spring 148. The other end of this spring is in contact with the inner end of the cutter wheel shaft 152. All lateral or longitudinal thrust is taken by this spring 148.

As shown the opposite end of the arbor pin is threaded through the outer side of the head and adjustment is effected by turning this pin to shift the cutter wheel shaft and the cutter wheel carried thereby to the proper cooperating position with the can rim bead engaging driving roller, not shown, with which it may be used.

The arbor pin is secured in adjusted position by the lock nut 153 and upon the opposite side of the portion of the head against which the nut bears, is disposed the bowed spring 154, through which the arbor pin passes and which bears against the adjacent end of the grooved roller 150. This spring 154 is of relatively light tension and the ends thereof are bent over to engage across opposite edges of the head portion, in the same manner as spring 71 or the subsequently described springs 111, 130 and 131. This spring 154 resists the movement of the grooved roller outwardly on the arbor pin.

Figures 24 and 25, illustrate another embodiment of the cooperating roller construction which may be more economically produced than the previously described forms. These illustrations show the cooperating roller designated 155, the cutter wheel 156 and the driving wheel 157, in approximately the same relation to each other as they are shown in Figures 18 and 19.

In the construction here shown the body is designated 158 and the upper portion 159 which is inclined toward the inner side of the implement, terminates in the inwardly turned flange 160.

Positioned against the inner side of the portion 159 is the substantially U-shaped head member 161 comprising the inner and outer leg portions 162 and 163 respectively and the top yoke portion 164.

Extending through and fixed in the inclined portion 159 are the vertically spaced parallel bearings 165 and 166.

The outer leg 163 of the U-shaped head 161 is slotted as indicated at 167 to engage over the bushing 165 and threaded on the bushing is a binding nut 168 which bears against this leg 163 to secure it in position.

To the outer side of the inclined portion 159 of the body plate is secured the fixed or stationary handle 169 and threaded upon the outer end of the bushing 165, which passes through the part of the handle bearing against the body plate, is the lock nut 170.

The two bushings 165 and 166 are externally threaded and are threaded into the openings of the portion 159 of the body plate through which they pass. The lower bushing 166 also has threaded thereon the binding nuts 171 to secure it in fixed position. Obviously other methods may be employed for securing the bushings in the body, however, when the illustrated method is employed the cutter wheel 156 and the cooperating roller 155, which has its shaft 172 mounted in the bearing 165, may be properly adjusted as desired, as will be readily apparent.

The cooperating roller 155 may have a flange thereon for lateral contact with the outer end of the cutter wheel shaft 173, which shaft is rotatably supported in the lower bearing 166, or such cooperating roller may be without a flange, as illustrated, in which case the outer face of the roller may have contact with the inner face of the cutter wheel near the circumference of the cutter wheel shaft.

The U-shaped head portion 164 functions as a spring and the inner side 162 extends down beyond the center of the roller 155 and is provided with a threaded opening for the reception of the adjusting screw 174 which is locked in position by the lock nut 175. The axis of this adjusting screw is in line with the axis of the shaft 172 and the inner end of the screw contacts the center of the wheel 155 as illustrated.

If the bushings 165 and 166 are not made adjustable in the manner illustrated, adjustment may be had by providing some clearance between the cutter wheel and the adjacent end of the bushing 166 and also between the wheel 155 and the adjacent end of the bushing 165 as shown, and adjusting the cooperating roller and cutter wheel inwardly by means of the adjusting screw 174.

The opening or passage through the bearing 166 is concentric at the outer end, remote from the cutter wheel, with the cutter wheel shaft but is elliptical at the end adjacent to the cutter wheel. This elliptical shape tapers to zero or to a circular form at the outer end of the bearing so that the end of the shaft 173 which is in contact with the roller 155, may always seat against the periphery of such roller. As will be readily apparent the long axis of the elliptical portion of the bearing 166, is in line with the axis of the shaft 172 and this elliptical portion of the bearing is designated 176.

The construction of the lower and movable handle, designated 177, is the same as that shown for the handle in the embodiment illustrated in Figures 18 and 19 and since the mounting of the adjacent parts is the same it is not believed necessary to give a detailed description of the construction.

From the foregoing it is believed that it will be readily apparent that the device of the present invention in its several embodiments, is of a character to be easily installed on a can and in addition it has the advantages that the handles may be employed for manipulating the can, such as when pouring hot contents therefrom and the long handles and proximity of the fulcrum to can driving wheel, provide adequate leverage for puncturing the end or head of the can. In addition the large surface of the yoke of the movable handle and the positioning of the can driving wheel midway of this surface, provides for a minimum of wear and unusually good alignment of the can driving wheel, even after prolonged use.

The positioning of the movable handle close to the can driving wheel reduces thrust between the yoke of such handle and the upright body, thereby reducing effort required to puncture the end or head of the can.

It will also be apparent that the lateral resiliency provided for the cutter wheels permits adequate lateral separation of such wheels from the can driving wheel when subjected to unusual strains such as when passing the seam of a can and the can rest, particularly the rest illustrated in Figure 12, provides for greater stability of the device on the can and for varying the traction of the can driving wheel with the underside of the rim of the can at the will of the operator.

Use of the anti-frictional roller bearing construction with the cutter wheel shaft materially reduces both radial and lateral friction to provide greater ease of operation, and same is accomplished most economically. If desired, such structure could be economically encased.

I claim:

1. A rotary feed wheel type can opener, comprising a relatively long body plate, a relatively long, straight handle secured rigidly at one end to and extending from a side of the body plate in a plane parallel with a side face thereof, a pair of co-acting rotary elements supported at one side face of the body plate and comprising a cutter and a can rim engaging driving wheel, one of said elements being shiftable relative to the other, means for rotating the wheel element, a second relatively long, straight handle in cooperative relation with the first handle and extending at one end across a side face of the body plate, a pivot between said end of the second handle and the body plate, and a connecting means between one element and the second handle at a point spaced longitudinally of the second handle from the pivot for effecting relative movement in a straight line path between the elements by pivotal movement of the second handle relative to the first handle.

2. In a rotary feed wheel type can opener, a body plate, a relatively long straight handle secured rigidly to the body plate, a pair of shafts each extending through the body plate, a cutter element connected to one shaft, a rotary can rim engaging driving wheel element connected to the other shaft, means maintaining one of said shafts for movement in a straight line path toward and away from the other shaft to effect relative movement between the elements, means for rotating the wheel element carrying shaft, and a second relatively long straight handle having a fulcrum coupling with the body plate and having an operative connection with the movable shaft at a point spaced longitudinally of the second shaft from the fulcrum for effecting movement of said one shaft in said straight line path and for effecting the said relative movement of the elements upon relatively moving the handles.

3. A rotary feed wheel type can opener, comprising a body plate, a relatively long straight handle rigidly connected at one end to the body plate, a pair of co-acting elements supported by the body plate at one side thereof and comprising a cutter and a can rim engaging driving wheel, means maintaining one of said elements for movement in a straight line path toward and away from the other element, means for rotating the wheel, a second relatively long straight handle disposed substantially parallel to the first handle, a pivotal coupling between the second handle and the body plate, and a coupling between the pivoted handle and the movable element which is spaced longitudinally of the second handle from the said pivotal coupling.

4. A rotary feed wheel type can opener comprising a pair of relatively long straight handle members, pivotal coupling means between the handle members, a relatively long body disposed transversely of the handle members at the pivotally coupled ends and having one of the handle members rigidly connected thereto, a pair of relatively movable co-acting elements, one of said elements being fixed to the body and the other element being connected to the body and to the movable handle to be shifted by said movable handle relative to the fixed element, guide means in the body for said other element to restrict movement of the other element to a substantially straight line path, one of said elements comprising a cutter and the other element comprising a rotatable can rim engaging driving wheel, and means for turning said wheel.

5. A rotary feed wheel type can opener, comprising a relatively long body plate designed to be positioned vertically when in use, a pair of relatively long straight handle members having a substantially parallel relation and disposed perpendicular to the body plate, one of said handle members being rigidly connected at one end to the body plate, a fulcrum coupling between that end of the other handle nearest the body plate and the body plate whereby relative movement may be had between the handles, a pair of co-acting elements one of which is directly coupled with the body plate and the other being coupled with the body plate indirectly through the second mentioned handle at a point on the second mentioned handle spaced longitudinally thereof from the fulcrum coupling to be moved with the second mentioned handle relative to the first element, one of said elements comprising a cutter and the other element comprising a rotatably supported can rim engaging driving wheel, and means for effecting the rotation of the driving wheel.

6. A rotary feed wheel type can opener, comprising a rigid unit consisting of a relatively long plate and a handle member having a perpendicular relation to an edge of the plate, a second relatively long straight handle member disposed in substantially parallel relation with the first handle member and having an end disposed across the plate, a pivotal coupling between the unit and the second handle member, a pair of co-acting elements comprising a cutter and a can rim engaging driving wheel, one of the elements being attached directly to the plate to be held against movement thereby and the other one of the elements being attached directly to that portion of the second handle extending across the plate at a point spaced longitudinally of the second handle from said pivotal coupling, to be moved by the second handle relative to the first mentioned element, and means for effecting the rotation of the wheel.

7. A rotary feed wheel type can opener, comprising a rigid unit consisting of a relatively long plate and a handle member having a perpendicular relation to an edge of the plate, a second handle member disposed in substantially parallel relation with the first handle member and having an end disposed across the plate, a pivotal coupling between the unit and the second handle member, a pair of co-acting elements comprising a cutter and a can rim engaging driving wheel, one of the elements being attached directly to the plate to be held against movement thereby and the other one of the elements being attached directly to that portion of the second handle extending across the plate to be moved by the second handle relative to the first mentioned element, means for effecting the rotation of the wheel, the second mentioned element attached to and moved by the pivoted handle being attached also to the plate by a shaft extending transversely through the plate and disposed in an elongated guide opening having its long axis extending lengthwise of the plate.

8. A rotary feed wheel type can opener comprising a rigid unit consisting of a relatively long plate and a handle extending perpendicularly to an edge of the plate, a second handle having a substantially parallel relation with the first handle and having a portion extended across the plate and turned back upon itself to form a yoke enclosing the plate, a pivotal connection between the yoke and the unit, a pair of co-acting elements comprising a cutter and a can rim engaging driving wheel, one of said elements being secured against movement to the plate and the other element being connected with said yoke to be shifted upon oscillation of the second handle, relative to the fixed element, the wheel element being supported for rotation, and means for turning the wheel element.

9. A rotary feed wheel type can opener as set forth in claim 8, in which the wheel element is the element connected with the yoke and includes a shaft extending through both sides of the yoke and through the plate, the plate having a long opening formed longitudinally therein to facilitate movement of the shaft in a direction lengthwise of the plate upon oscillation of the yoke and the handle of which the yoke forms a part.

10. A rotary feed wheel type can opener, comprising a rigid unit consisting of a relatively long plate and a relatively long handle extending in perpendicular relation to a longitudinal edge thereof, a second relatively long handle substantially parallel to the first handle and having a portion of one end disposed across the plate, a pivotal coupling between the said portion of one end of the second handle and the unit, a shaft extending through and supported by the said portion of the one handle and passing through an elongated opening in the plate, the opening extending lengthwise of the plate, the shaft being movable lengthwise of the plate upon oscillation of the second handle, a can rim engaging driving wheel carried by the shaft, means for turning the shaft, a second shaft supported by the plate, and a rotary cutter supported by the second shaft, said wheel being movable upon oscillation of the second handle in one direction to a position in which the peripheries of the can driving wheel and cutter wheel are in overlapping relation.

11. A rotary feed wheel type can opener as set forth in claim 10, with means supporting the cutter wheel for yielding movement axially of its supporting shaft and with respect to the adjacent periphery of the driving wheel.

12. A rotary feed wheel type can opener comprising a rigid unit consisting of a relatively long plate and a relatively long handle extending in perpendicular relation with a longitudinal edge of the plate, a second relatively long handle having a substantially parallel relation with the first handle and having a portion of one end turned back upon itself to provide an elongated yoke, one side of the yoke being defined by a leg, the said plate being enclosed in the yoke, a pivot pin extending transversely of the yoke between the free end of the leg and the opposite side of the yoke, a shaft rotatably supported by and extending through the two sides of the yoke and through the interposed plate, the plate having an elongated opening extending lengthwise thereof through which the shaft passes, a can rim engaging driving wheel supported upon the shaft at one end, means at the opposite end of the shaft for turning the shaft and wheel, a second shaft passing through the plate and supported for yieldable axial movement, a rotary cutter wheel carried by the second shaft, said driving wheel being movable upon oscillation of the second handle to a position where its periphery is in overlapping relation with the periphery of the rotary cutter, and said pin being pivotally coupled with the unit.

13. A rotary feed wheel type can opener as set forth in claim 12, in which the pivotal connection between the pin and the unit, comprises a link having an end disposed within the yoke and having the pivot pin passing therethrough, and a second pivot pin passing through the opposite end of the link and secured to an adjacent portion of the unit.

14. A rotary feed wheel type can opener, comprising a rigid unit consisting of a relatively long plate and a relatively long handle extending from the plate in perpendicular relation to a longitudinal edge thereof, a relatively long second handle having a portion of one end turned back upon itself to form an open yoke, a part of the handle forming one side of the yoke and the opposite side of the yoke being in the form of a leg having a free end, the plate being disposed between the two sides of the yoke, a pin connecting the free end of the yoke leg and the opposite side of the yoke, a link pivotally connected at one end to the pin and having its other end pivotally attached to the unit, a rotatable shaft extending through and carried by the two sides of the yoke and passing through the interposed plate, the plate having an elongated longitudinally extending opening through which the shaft passes, a can rim engaging driving wheel carried by the shaft, a rotary cutter supported by the plate in operative relation with the wheel, the wheel being movable upon oscillation of the second handle in one direction to bring the periphery of the wheel into cutting relation with the cutter, and means for rotating the shaft comprising a gear mounted upon the shaft, a gear pinion supported for rotation by said pin and a crank connected with the gear pinion, the pinion being in mesh with the gear.

15. A rotary feed wheel type can opener, comprising a rigid unit consisting of a relatively long plate and a relatively long handle extending in perpendicular relation with a longitudinal edge of the plate, the plate having an edge portion extended to provide an ear, a second handle having a portion of one end turned back upon itself to provide a yoke one side of which is in the form of a free leg, the yoke enclosing the portion of the plate in which the ear is formed, a pivot pin extending transversely between the two sides of the yoke and passing through said ear, a pin connecting the free end of the leg with the adjacent side of the yoke, said plate having an arcuate slot formed therein and struck from the center of the pivot pin, a rotary shaft extending through the slot and through the two sides of the yoke, means upon one end of the shaft for rotating the same, a can rim engaging driving wheel upon the other end of the shaft, and a cutter supported by the plate for cooperative relation with said wheel, the wheel being movable upon oscillation of the second handle to a position in which the periphery thereof comes into a predetermined operative position with respect to the cutter.

16. A rotary feed wheel can opener comprising a relatively long body plate formed at one end to provide a head having spaced inner and outer sides, an arbor supported by and between said sides, yieldable means connected with an end of the arbor and bearing against the adjacent side of the head for normally maintaining the arbor in a prescribed position, a cutter wheel rotatably supported on the arbor between the two sides of the head, means coupling the cutter wheel with the arbor in a manner to permit the wheel and arbor to move together axially of the arbor against the resistance of the yieldable means, a rotatably supported can rim engaging driving wheel disposed in cooperative relation with the cutter wheel, means for turning the driving wheel, and means operatively connected between the plate and the rotatably supported driving wheel for effecting the forcible movement of the driving wheel into cooperative relation with the cutting wheel where a side of the driving wheel adjacent to the periphery is in spaced working relation with a side of the cutting wheel adjacent the periphery of the latter.

17. A rotary feed wheel type can opener as set forth in claim 16, in which said yieldable means comprises a resilient plate-like member through which an end of the arbor passes, the plate-like member having contact with the adjacent portion of the head at two remotely related points and being spaced from the head between such points, and a securing element threaded upon the arbor and bearing against the plate member to maintain said points in contact with the adjacent side portion of the head.

18. A rotary feed wheel type can opener of the character stated in claim 16, with a can rim engaging rest carried by the head and including a pair of spaced parallel arms between which the head is located, the arms having parallel bottom edges against which the top edge of a can rim may contact when the cutter wheel and driving wheel are in cooperative working relation.

19. A rotary feed wheel type can opener, comprising a relatively long body plate formed at one end to provide a head having two spaced parallel inner and outer portions, a shaft rotatably supported by and extending between said inner and outer portions, means allowing for limited movement of the shaft in a direction lengthwise of the head, an arbor extending between and carried by the two portions of the head and paralleling said shaft, a peripherially channeled wheel rotatably supported on the arbor and having peripheral contact with said shaft, a cutter disk supported upon the shaft and lying partly within said channel, said arbor being supported for axial movement and said wheel having a length less than the distance between the inner sides of the head portions, co-acting means between the wheel and the arbor by which axial thrust against the wheel will effect axial movement of the arbor, resilient means connecting the arbor with a side portion of the head and resisting said axial movement of the arbor, a rotatably supported can rim engaging driving wheel disposed adjacent to the cutter disk, and means forming an operative coupling between the body plate and the driving wheel for effecting the forcible movement of the driving wheel to a cooperating working relation with the cutter disk.

20. A rotary feed wheel type can opener of the character set forth in claim 19, in which the said yieldable means comprises a flat bowed spring extending across the said side portion of the head and traversed by the arbor and having only its extreme ends in contact with the adjacent portion of the head.

21. A rotary feed wheel type can opener as set forth in claim 19, in which the said yieldable means comprises a pair of flat bowed springs disposed one across the inner side of the said adjacent side portion of the head and the other across the outer side of said head side portion, both of said springs being traversed by the arbor and each spring being in contact only at its extreme ends with the interposed side portion of the head, the said cutter disk having a hub engaged at one end against the inner spring, the said co-acting means between the disk and the arbor comprising a head formed on the arbor at the end remote from the springs and against which the other end of the hub bears, and a securing element detachably connected with the end of the arbor remote from the head and bearing against the outer side of the outer one of the springs.

22. A rotary feed wheel type can opener, comprising a relatively long body plate having a portion of one end formed to provide a head having spaced parallel inner and outer sides, a shaft rotatably supported by and extending between said sides of the head, the said sides of the head being formed to permit movement of the shaft in a lengthwise direction on the head, an arbor extending through the said sides of the head in spaced parallel relation with the shaft, a peripherially channeled wheel supported on the arbor between the two sides of the head and having contact with the shaft, a cutter disk secured to the shaft and having a portion lying within the channel of the wheel, said arbor having a head upon one end and having its other end secured in the side of the head through which it passes, a bowed spring extending across the inner side of the portion of the head remote from the arbor head and traversed by the body, said bowed spring contacting the adjacent side of the head only at its extreme ends, said wheel having a hub bearing against said spring, and the wheel having limited movement axially upon the arbor, and a second bowed spring traversed by the arbor and interposed between the head of the arbor and the adjacent side of the first mentioned head, one end of the second bowed spring bearing against the adjacent side of the first mentioned head and having its other end bearing against an end of the shaft.

23. A rotary feed wheel type can opener, comprising a relatively long body plate having a portion of one end formed to provide a head having spaced parallel inner and outer side portions, an arbor extending through and connecting the side portions of the head, the arbor having a head mounted in one side portion and having a thickness greater than the said one side portion, a bowed spring member disposed upon the outer side of the other side portion and bearing thereagainst at two remote points, said bowed spring being traversed by the other end of the arbor, means carried by the said other end of the arbor and bearing against the outer side of the bowed spring for maintaining the arbor and the spring in a prescribed position relative to the first head, a cutter disk rotatably supported on the arbor and having a hub engaged at one end against the inner side of the arbor head, an idler roller supported upon the arbor upon the side of the disk opposite from the hub, the idler roller having a hub bearing against the inner side of the adjacent side portion of the first mentioned head, a can rim engaging driving wheel carried by the body plate for cooperative working relation with the cutter disk, and means forming an operative coupling between the driving wheel and the body plate which is constructed and arranged to facilitate the forcible movement of the driving wheel into the stated cooperative working relation with the cutter disk.

24. A rotary feed wheel type can opener, comprising a relatively long body plate, a pair of spaced parallel bearing sleeves extending through the body plate and secured thereto, an inverted substantially U-shaped spring member having two legs and a connecting portion therebetween, one of the said legs being positioned against the body plate and having one bearing sleeve extending therethrough, the other leg extending across and having spaced relation with the said one of the bearing sleeves, a wheel disposed between the said other one of the legs and the said one of the bearing sleeves and having an axle rotatably supported in the adjacent bearing sleeve, an adjustable centering member carried by the said other leg and bearing against the center of the wheel at the opposite side from the axle, a shaft rotatably mounted in the other bearing sleeve and having the periphery of the wheel closely adjacent to the peripheral surface thereof, a cutter disk supported by the shaft between the wheel and the end of the bearing sleeve in which the shaft is mounted, the disk being free from engagement with the wheel and the adjacent end of the last mentioned sleeve, said other bearing sleeve being formed interiorly at the end adjacent to the cutter disk to permit movement of that end of the shaft which is adjacent to the wheel, relative to the wheel periphery, a can rim engaging driving wheel supported by the body plate for movement relative to the cutter disk, means forming an operative coupling between the body plate and the driving wheel for effecting the forcible movement of the driving wheel relative to the disk, and means for turning the driving wheel.

ROBERT E. McLEAN.

REFERENCES CITED

The following references are of record in the file of this patent:

UNITED STATES PATENTS

| Number | Name | Date |
|---|---|---|
| 2,085,219 | Hosmer | June 29, 1937 |
| 2,244,846 | Moeller | June 10, 1941 |